United States Patent
Rothman et al.

(10) Patent No.: US 7,269,768 B2
(45) Date of Patent: Sep. 11, 2007

(54) METHOD AND SYSTEM TO PROVIDE DEBUGGING OF A COMPUTER SYSTEM FROM FIRMWARE

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 598 days.

(21) Appl. No.: 10/804,484

(22) Filed: Mar. 18, 2004

(65) Prior Publication Data

US 2005/0229160 A1 Oct. 13, 2005

(51) Int. Cl.
*G11C 29/00* (2006.01)
(52) U.S. Cl. .................. 714/723; 714/25; 714/48; 714/57; 714/42; 714/799; 714/712
(58) Field of Classification Search ............... 714/724, 714/13, 51, 55, 799, 38, 42, 712, 723; 717/4, 717/124
See application file for complete search history.

(56) References Cited

U.S. PATENT DOCUMENTS 5,715,387 A * 2/1998 Barnstijn et al. ............. 714/38
5,850,562 A * 12/1998 Crump et al. .................. 713/1
6,219,782 B1 * 4/2001 Khan et al. ................. 712/227
6,219,828 B1 * 4/2001 Lee ............................ 717/129

* cited by examiner

*Primary Examiner*—Guy J. Lamarre
*Assistant Examiner*—Esaw Abraham
(74) *Attorney, Agent, or Firm*—Blakely, Sokoloff, Taylor & Zafman LLP

(57) ABSTRACT

A method, system and article of manufacture to provide debugging of a computer system from firmware. A debugger in a first computer system is initialized during the pre-boot phase of the first computer system, the debugger to operate from a firmware environment of the first computer system. A communication channel of the first computer system is initialized to enable a second computer system to be communicatively coupled to the first computer system. The debugger is entered in response to a debug event. The first computer system is examined with the debugger. In one embodiment, the firmware of the first computer system operates in accordance with an Extensible Firmware Interface (EFI) specification.

24 Claims, 7 Drawing Sheets

METHOD AND SYSTEM TO PROVIDE DEBUGGING OF A COMPUTER SYSTEM FROM FIRMWARE

BACKGROUND

1. Field of Invention

The field of invention relates generally to computer systems and, more specifically but not exclusively, relates to debugging of a computer system from firmware.

2. Background Information

In typical computer architecture, the initialization and configuration of the computer system by the Basic Input/Output System (BIOS) is commonly referred to as the pre-boot phase. The pre-boot phase is generally defined as the firmware that runs between the processor reset and the first instruction of the Operating System (OS) loader. At the start of a pre-boot, it is up to the code in the firmware to initialize the system to the point that an operating system loaded off of media, such as a hard disk, can take over. The start of the OS load begins the period commonly referred to as OS runtime. During OS runtime, the firmware may act as an interface between software and hardware components of a computer system. As computer systems have become more sophisticated, the operational environment between the OS level and the hardware level is generally referred to as the firmware or the firmware environment.

Debugging errors and malfunctions in a deployed computer system can be difficult and expensive. When a problem is not repeatable in a laboratory, a technician must travel to the site of the computer system in order to evaluate the system. In some cases, the technician will attach an In-Circuit Emulator (ICE) to monitor the platform operations. Such probes may cost up to $25,000 each. Some ICEs are sandwiched between the central processing unit (CPU) and the motherboard, while others are connected to the platform via a Joint Test Action Group (JTAG) port on the motherboard. If the problem appears to occur randomly in several systems in a network, it becomes impractical and cost prohibitive to install multiple ICE's across multiple machines. Also, the technician often has to stay at the customer's location waiting for the error to repeat itself.

Current software debuggers have limited capabilities. They exist only during the OS runtime phase and do not provide debugging support during the pre-boot phase of the computer system. These debuggers are often OS applications so changes to a system's OS may require changes to the debugger.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a method and system to provide debugging of a computer system from firmware are described herein. In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention may employ a firmware environment known as the Extensible Firmware Interface (EFI) (Extensible Firmware Interface Specification, Version 1.10, Dec. 1, 2002, available at http://developer.intel.com/technology/efi.) EFI is a public industry specification that describes an abstract programmatic interface between platform firmware and operating systems or other application environments. EFI enables firmware, in the form of firmware modules and drivers, to be loaded from a variety of different resources, including primary and secondary flash devices, option ROMs (Read-Only Memory), various persistent storage devices (e.g., hard disks, CD-ROM (Compact Disk-Read Only Memory), etc.), or from one or more computer systems over a computer network.

Figure 1:
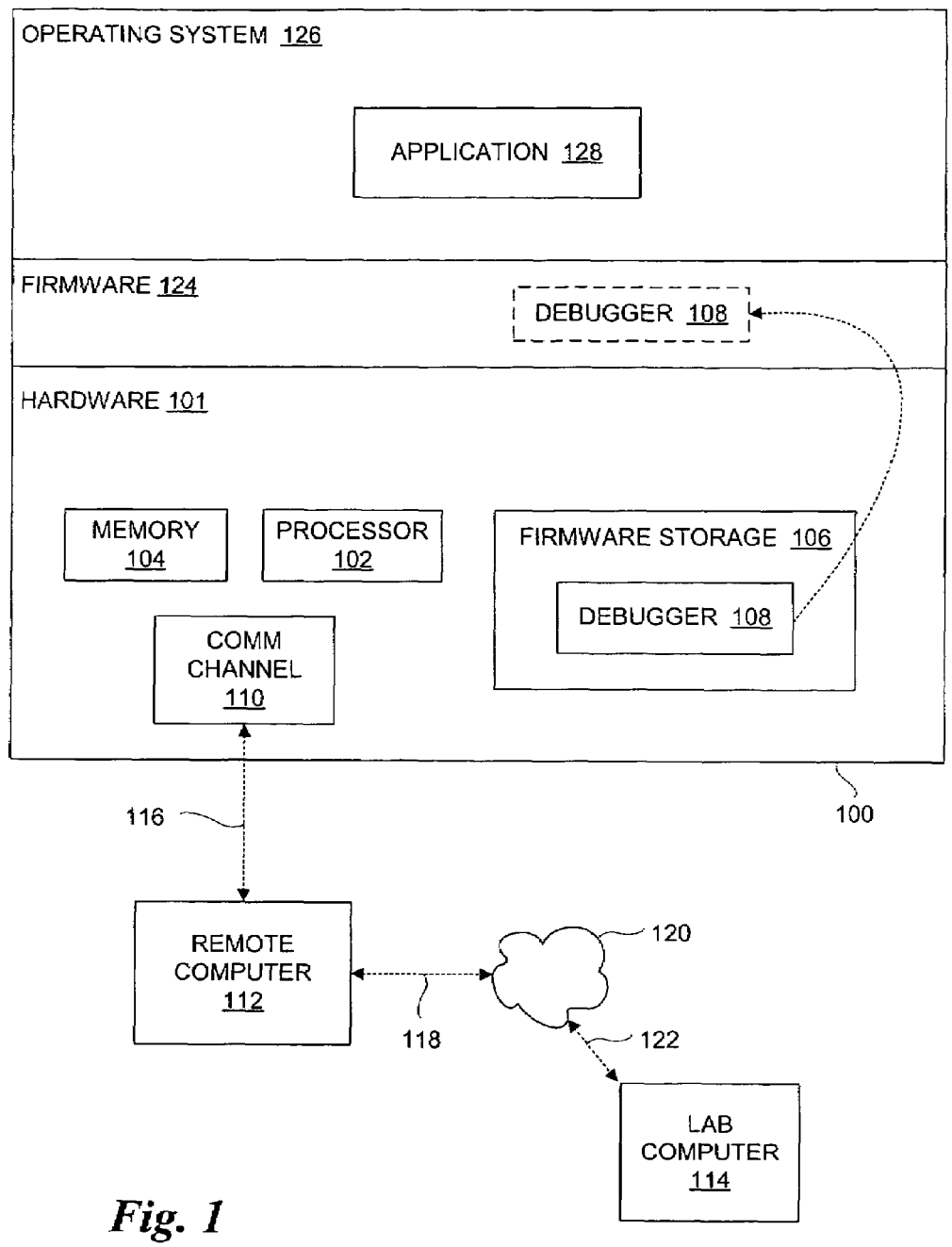
FIG. 1 is a block diagram illustrating one embodiment of debugging a computer system from firmware in accordance with the teachings of the present invention.

FIG. 1 illustrates one embodiment of a computer system 100 having a debugger 108. Computer system 100 includes a hardware layer 101, a firmware layer 124, and an OS layer 126. The OS layer 126 may include an application 128.

Hardware layer 101 includes a processor 102, a memory device 104, firmware storage 106, and a communication channel 110. The processor 102, memory device 104, firmware storage 106, and communication channel 110 may each be operatively coupled to each other by one or more busses (not shown).

The debugger 108 is stored in firmware storage 106. It will be understood the firmware storage 106 may include one or more firmware storage devices, such as flash memory devices. In another embodiment, debugger 108 may be loaded from other persistent storage of computer system 100 such as a hard disk drive, or an optical storage device. Debugger 108 may also be loaded from persistent storage outside of computer system 100 over a connection to system 100. In yet another embodiment, debugger 100 is compliant with the EFI specification.

Communication channel 110 may communicatively couple the computer system 100 to a network or to another computer system. Communication channel 110 may include a network interface or a communication port, such as a serial port, parallel port, Universal Serial Bus (USB) port, a wireless communication port, or the like.

FIG. 1 also shows a remote computer 112 communicatively coupled to communication channel 110 over connection 116. Remote computer 112 may receive debugging information from computer system 100 or may send debug commands to computer system 100 over connection 116. In one embodiment, remote computer 112 is a technician's laptop computer used by a technician in debugging the computer system 100.

FIG. 1 also shows a connection 118 to communicatively couple remote computer 112 to a network 120. Network 120 may be communicatively coupled to a laboratory computer 114 over a connection 122. In one embodiment, laboratory computer 114 is a computer system at the technician's home site. The technician may use laboratory computer 114 to communicate with remote computer system 112 and subsequently computer system 100 to debug system 100.

Connections 116, 118, and 122 include wired or wireless connections. Network 120 includes an Internet, or any other network to communicatively couple two or more computer systems. In an alternative embodiment, computer system 100 is communicatively coupled to network 120 without communications passing through remote computer 112.

Figure 2A:
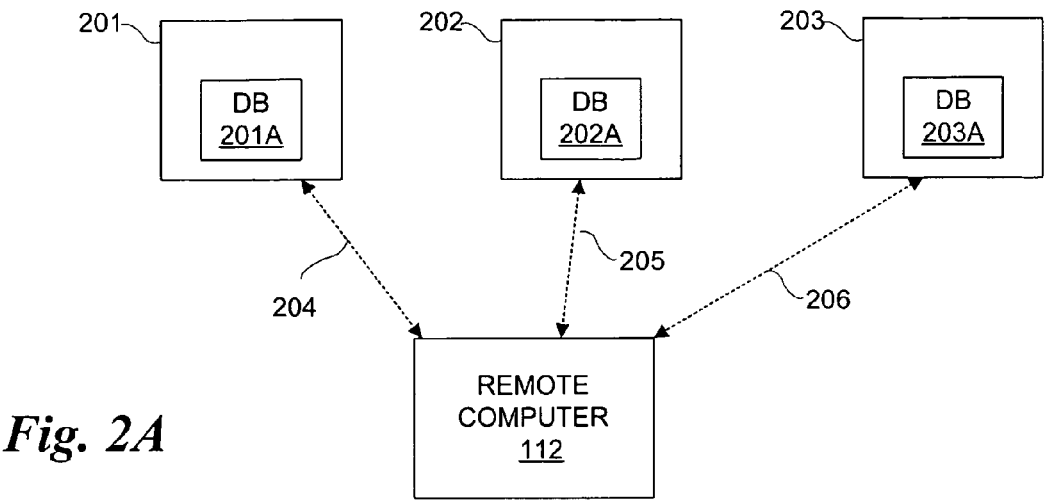
FIG. 2A is a block diagram illustrating one embodiment of debugging a computer system from firmware in accordance with the teachings of the present invention.

FIG. 2A illustrates an embodiment to provide debugging of computer systems 201, 202 and 203 from remote computer 112. Computer systems 201-203 include a debugger ("DB") 201A, 202A, and 203A, respectively. Remote computer system 112 is communicatively coupled to computer system 201 via connection 204, to computer system 202 via connection 205, and to computer system 203 via connection 206. Remote computer 112 may communicate with debuggers 201A, 202A, and 203A to provide debugging support of their respective computer systems.

Figure 2B:
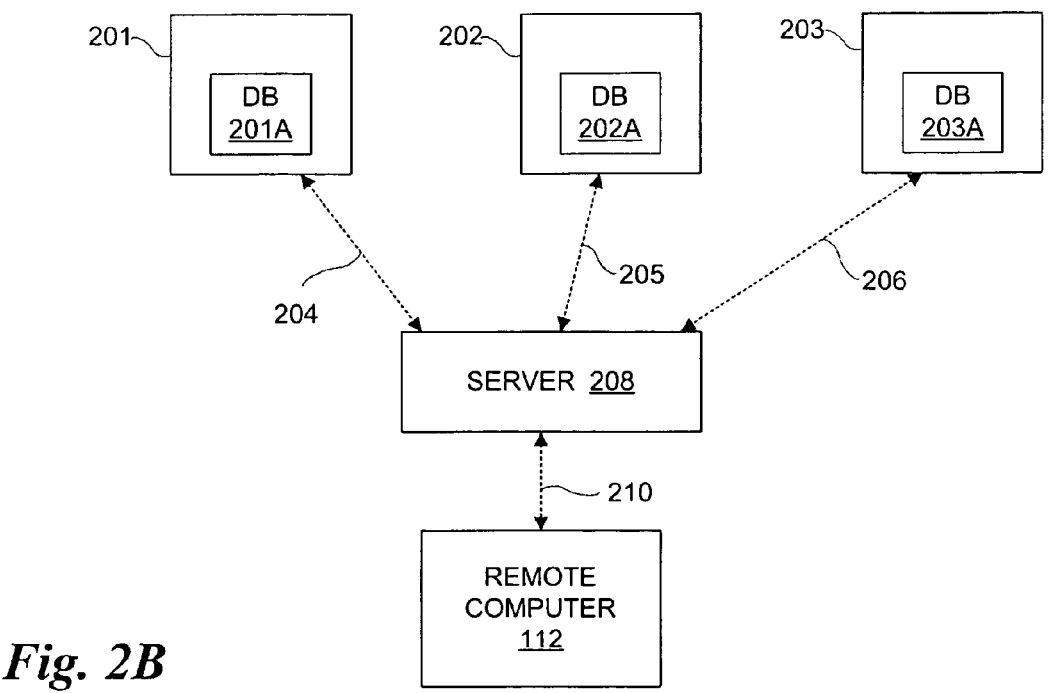
FIG. 2B is a block diagram illustrating one embodiment of debugging a computer system from firmware in accordance with the teachings of the present invention.

FIG. 2B shows computer systems 201-203 having debuggers 201A-203A, respectively. Computer systems 201-203 are communicatively coupled to a server 208 via connections 204, 205, and 206, respectively. Server 208 is connected to remote computer 112 via connection 210. Remote computer 112 may communicate with debuggers 201A, 202A, and 203A via server 208. In other embodiments, remote computer 112, in FIGS. 2A and 2B, may be communicatively coupled to laboratory computer 114 as described above in conjunction with FIG. 1.

Figure 3:
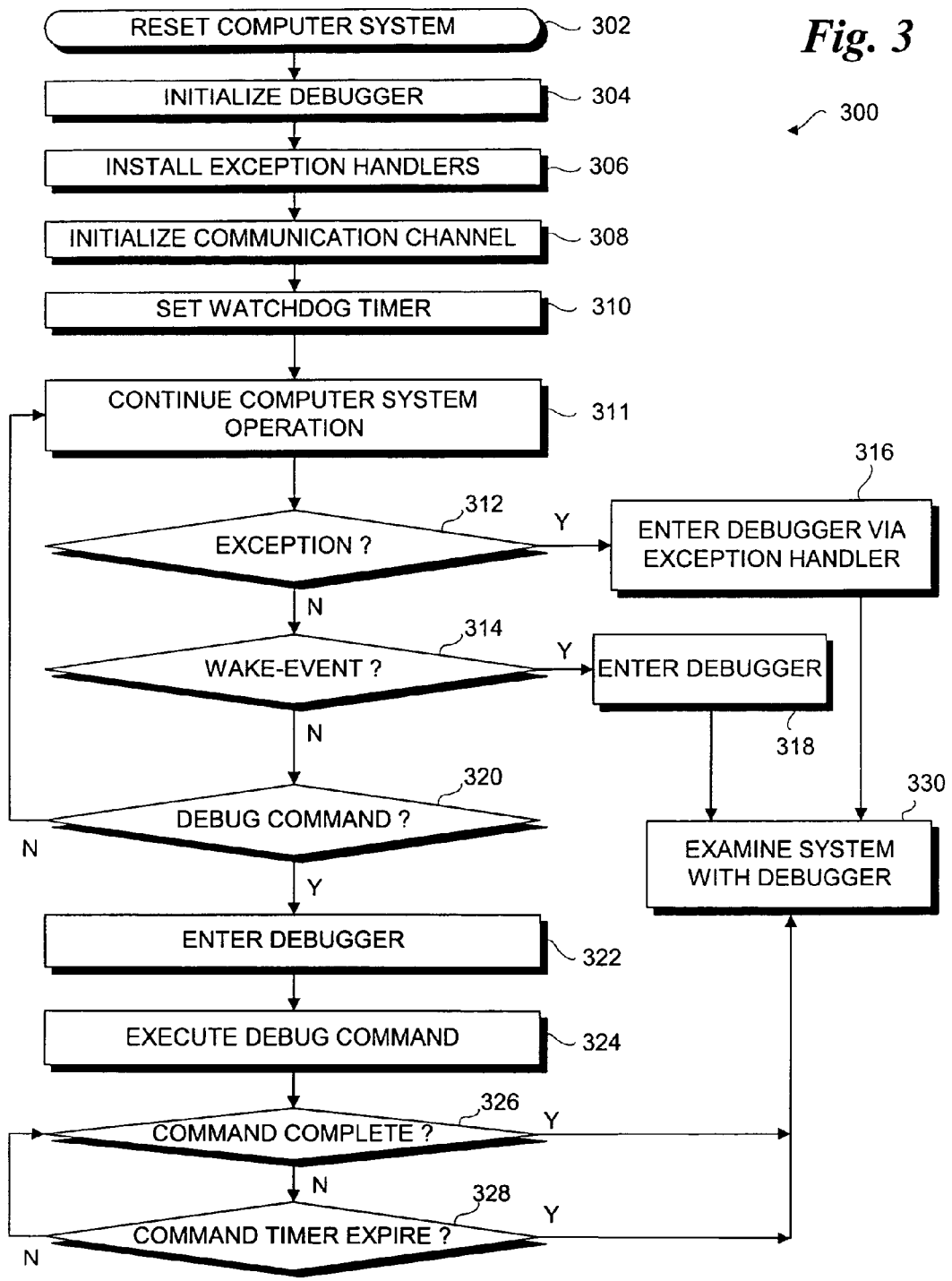
FIG. 3 is a flowchart illustrating one embodiment of the logic and operations to debug a computer system from firmware in accordance with the teachings of the present invention.

FIG. 3 illustrates a flowchart 300 showing one embodiment of the logic and operations to provide debugging of a computer system from firmware. Beginning in a block 302, a computer system is started/reset. Boot instructions stored in the computer system firmware are loaded and executed. In one embodiment, the system boot instructions will begin initializing the platform by conducting a Power-On Self-Test (POST) routine.

Proceeding to a block 304, a debugger is initialized. In one embodiment, the debugger is loaded from firmware storage of the computer system; in another embodiment, the debugger is loaded from persistent storage outside of the computer system. The debugger operates from the firmware layer of the computer system.

In a block 306, exception handlers are loaded that point to the debugger. When an exception occurs, the currently running event is suspended and flow will be directed to an exception handler. An exception may be generated by hardware or software. In one embodiment, exceptions intended to be managed by platform exception handlers will be directed to the debugger.

Proceeding to a block 308, a communication channel for the debugger is initialized. The communication channel allows the debugger to communicate with a remote computer communicatively coupled to the computer system.

In a block 310, a watchdog timer for the detection of debug commands is set. The debugger uses the watchdog timer to periodically check the communication channel initialized in block 308 for any debug commands that may have been received from a remote computer communicatively coupled to the computer system. In one embodiment, the watchdog timer is set to check for a debug command every 5 seconds; in another embodiment, the watchdog timer is set to check for a debug command every 5 minutes.

The logic continues to a block 311 to continue operation of the computer system. The debugger may be active during all phases of the computer system including pre-boot, OS runtime, and after-life. As described below, the logic of flowchart 300 will continually check for a debug event. Generally, a debug event is an occurrence that triggers an action from the debugger. Debug events described below include receiving a debug command, receiving a wake-event, and detecting an exception that directs flow to the debugger. It will be understood that embodiments of the invention are not limited to the debug events described herein.

In a decision block 312, the logic determines if an exception has occurred. If the answer to decision block 312 is yes, then the logic proceeds to a block 316 to enter the debugger via an exception handler. In one embodiment, to enter the debugger, the computer system enters a system management environment where all current operations are suspended. Such environments include a System Management Mode (SMM) and a Processor Abstraction Layer (PAL) environment (discussed further below.)

The logic then proceeds to a block 330 to examine the computer system with the debugger. In one embodiment, the examination includes receiving and processing debug commands. Examples of debug commands include, but are not limited to, gathering the current register state, gathering the contents of a particular memory location, gathering the contents of the system stack, identifying the code that was executing when an exception occurred, gathering other machine state information, or the like.

The debugger may also generate a report of information gathered. The information gathered by the debugger may be sent to a display of the computer system, a storage device coupled to the computer system, a remote computer communicatively coupled to the computer system, a printer coupled to the computer system, or the like.

If the answer to decision block 312 is no, then the logic proceeds to a decision block 314 to determine if a wake-event has occurred to trigger the debugger. In one embodiment, the computer system will receive a wake event from a remote computer communicatively coupled to the computer system. Typically, a user, such as a technician, will initiate a wake-event after the OS has become hung. Generally, a hung OS is defined as a fatal error that may require a reboot of the OS. Such a fatal error may also be referred to as a system crash. In another embodiment, the OS may attempt to handle an exception through its own OS exception handlers. However, a failure of the OS exception handler to manage the exception may cause the OS to become hung.

If a wake-event is received in block 314, then the logic proceeds to a block 318 to enter the debugger. In one embodiment, a remote computer communicatively coupled to the computer system at the communication channel sends an interrupt to the computer system. In another embodiment, the remote computer sends a Wake-on LAN (Local Area Network) packet to the computer system to generate an interrupt at the computer system.

In yet another embodiment, a user of the computer system may call a technician to inform the technician that the system is hung. The user may communicatively couple a remote laptop to the hung system and inform the technician of the laptop's network address, such as an Internet Protocol (IP) address. The technician may then send a wake-event to the system and operate the debugger from the technician's home site. After block 318, the logic then proceeds to block 330 for examination of the computer system with the debugger.

If the answer to decision block 314 is no, then the logic proceeds to a decision block 320 to determine if the debugger has received a debug command. In one embodiment, the watchdog timer checks the communication channel periodically to see if a debug command has been received. If the answer to decision block 320 is no, then the logic proceeds back to block 311 to continue operation of the computer system.

If the answer to decision block 320 is yes, then the logic continues to a block 322 to enter the debugger. In a block 324, the received debug command is executed. In a decision block 326, the logic determines if the debug command is complete. If the answer to decision block 326 is yes, then the logic proceeds to a block 330.

If the answer to decision block 326 is no, then the logic continues to decision block 328 to determine if a debug command timer has expired. The debugger may use a debug command timer to prevent the debugger from becoming hung when executing a debug command. For example, a debug command may tell the debugger to report the state of an input/output port. If the input/output port is non-responsive, the debugger may become stuck in a loop waiting for the port to respond. If the answer to decision block 328 is no, then the logic returns to decision block 326; if the answer is yes, then the logic proceeds to block 330.

The debugger may be entered through a debug command to examine a healthy computer system. The system enters a system management environment, such as SMM. The debugger may be used to examine aspects of the computer system and to gather machine state information. After the examination of the system through the debugger is complete, the system management environment is exited and the computer system is returned to normal operations.

It will be understood that embodiments of the debugger may execute in the pre-boot phase, OS runtime, and after-life of the computer system. Generally, the after-life phase includes a period when the firmware regains control of the computer system from the OS. Control may be turned over to the firmware when the computer system has an OS fault, a hardware fault, or enters an Advanced Configuration and Power Interface (ACPI) sleep state. The after-life phase may end when the computer system is reset or wakes from a sleep state.

Further, embodiments of the debugger do not require the installation of additional hardware or software. In one embodiment, the debugger is part of the firmware shipped with a platform, and, thus, is available immediately upon deployment of the platform. Because the debugger may be executing on every computer system of a network, a technician may debug multiple computers from a single computer hooked to the network. Embodiments of the debugger may also provide for a technician to monitor and diagnose a problem system remotely from the technician's home site.

It will also be understood that the debugger is OS agnostic; the debugger is built-in to the firmware of the computer system and is not reliant on the existence or the state of an OS. The debugger is independent of the operating system and offers a ubiquitous view of the system. Since the debugger executes without dependency upon the OS, the debugger may be used across a variety of platforms having a variety of operating systems. Moreover, the update or changing of an OS on a particular system does not necessitate the updating or changing of the debugger.

Figure 4A:
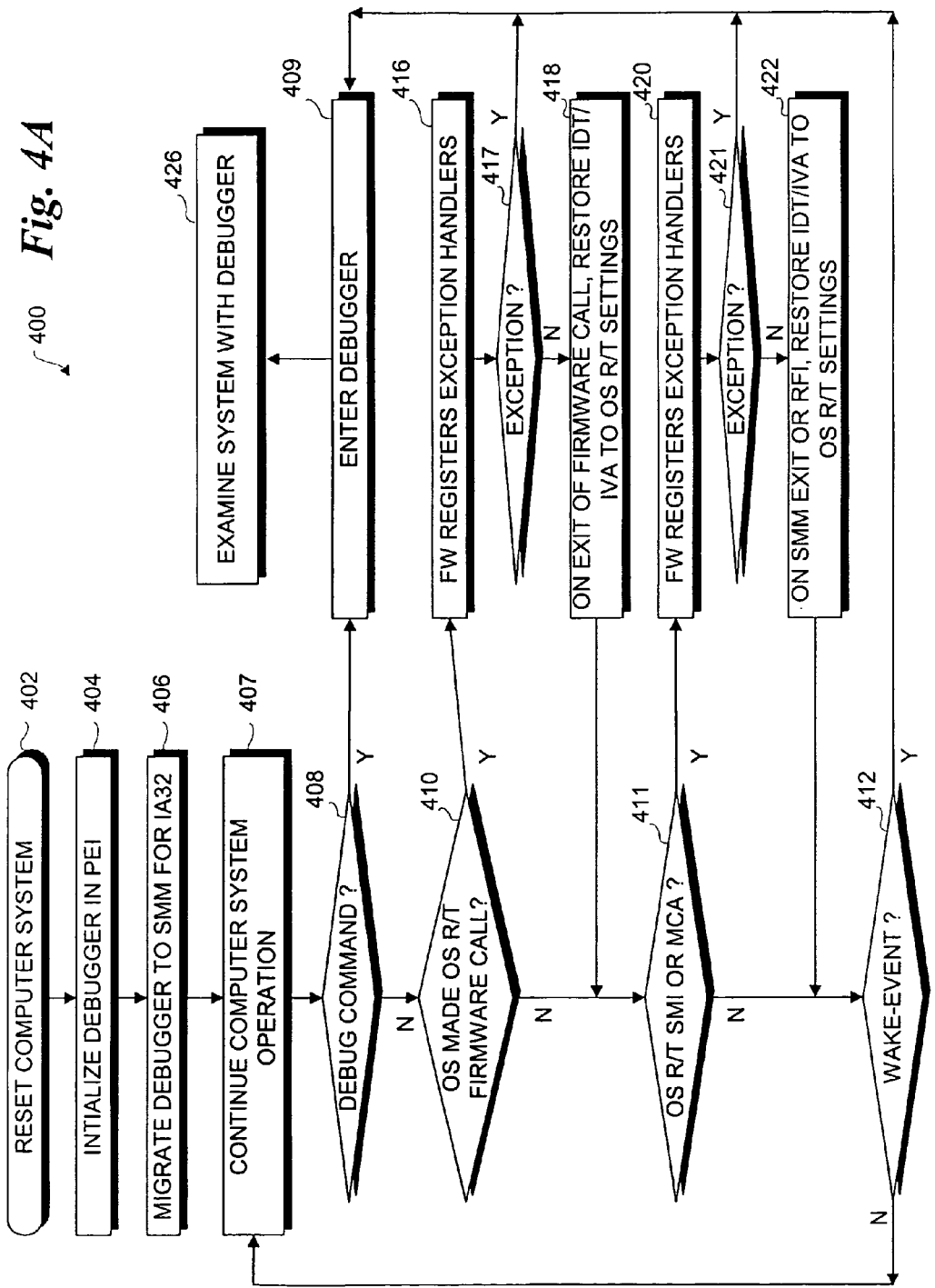
FIG. 4A is a flowchart illustrating one embodiment of the logic and operations to debug a computer system from firmware in accordance with the teachings of the present invention.
Figure 4B:
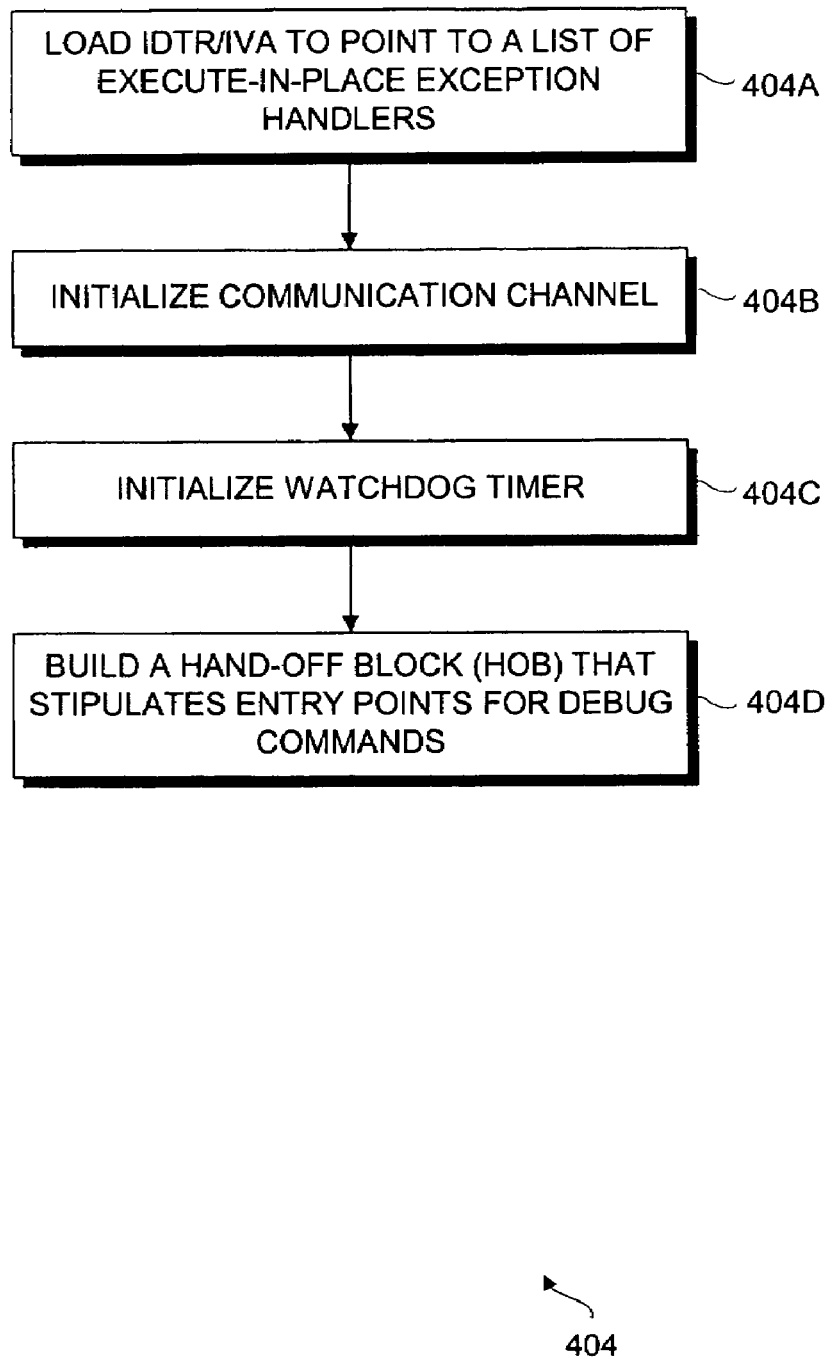
FIG. 4B is a flowchart illustrating one embodiment of the logic and operations to debug a computer system from firmware in accordance with the teachings of the present invention.
Figure 4C:
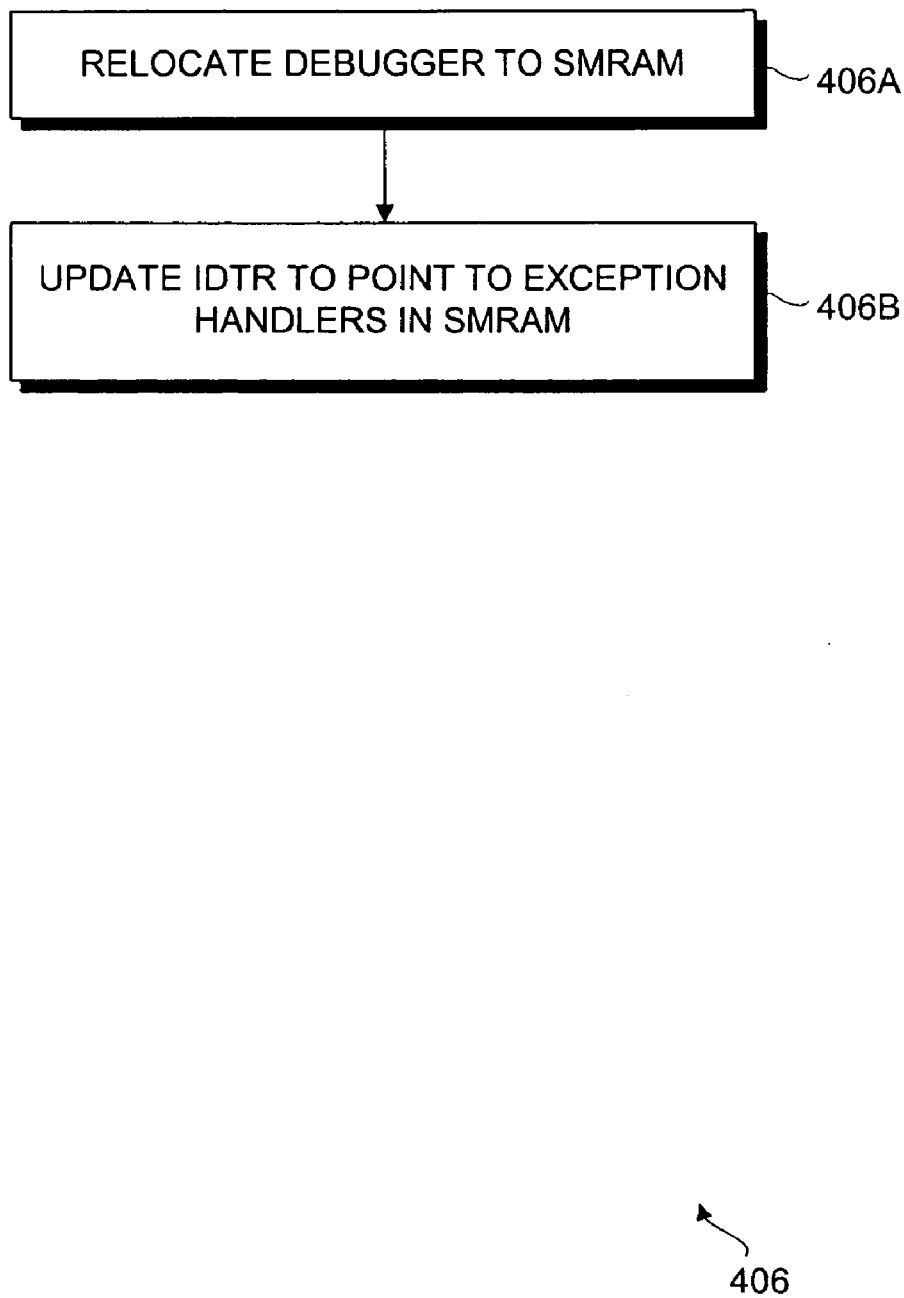
FIG. 4C is a flowchart illustrating one embodiment of the logic and operations to debug a computer system from firmware in accordance with the teachings of the present invention.

FIGS. 4A, 4B and 4C illustrate embodiments of the logic and operations to provide debugging of a computer system from firmware. FIGS. 4A, 4B and 4C will be described in relation to a 32-bit Intel Architecture (IA32) and Intel Itanium® based processors. However, it will be understood that embodiments of the present invention are not limited to IA32 or Itanium® processors.

FIGS. 4A, 4B and 4C are also described in connection with the Intel® Platform Innovation Framework for EFI Architecture Specification—Draft for Review, Version 0.9, Sep. 16, 2003 (available at www.intel.com/technology/framework) and hereinafter referred to as "the Framework." The Framework is but one embodiment of an implementation of the EFI specification for a firmware environment. Further, it will be understood that embodiments of the present invention are not limited to the Framework or implementations in compliance with the EFI Specification.

Starting in a block 402 a computer system is reset. Continuing to a block 404 the debugger is initialized during a Pre-EFI (PEI) phase of the Framework. In a block 406, the debugger is migrated to make the debugger available in SMM of an IA32 computer system. In the embodiment of flowchart 400, the migration is done during a Driver Execution Environment (DXE) phase of the Framework.

Referring to FIG. 4B, a flowchart 404 shows one embodiment of the logic and operations to initialize the debugger during the PEI phase of the Framework. The PEI phase provides a standardized method of loading and invoking specific initial configuration routines for a processor, chipset, and motherboard. The PEI phase is responsible for initializing enough of the system to provide a stable base for the follow on phases. Initialization of the platform's core components, such as the processor and chipset, is performed during the PEI phase. The PEI phase discovers memory and prepares a resource map that is handed off to the DXE phase. The state of the system at the end of the PEI phase is passed to the DXE phase through a list of position independent data structures called Hand Off Blocks (HOBs).

Starting in a block 404A, the Interrupt Descriptor Table Register (IDTR) (IA32) or Interruption Vector Address (IVA) (Itanium®) is loaded to point to a list of execute-in-place (XIP) exception handlers. The address of an Interrupt Descriptor Table (IDT) is maintained in the IDTR. The IDT holds a collection of gate descriptors that provide access to interrupt and exception handlers. The IVA stores the base of an Interrupt Vector Table (IVT). The IVT provides addresses to interrupt and exception handlers. In block 404A, the exception handlers the debugger may use are made available through the IDT/IVA.

Continuing to a block 404B, a communication channel is initialized. The debugger abstracts a communication channel of the computer system to enable the debugger to communicate with a remote computer communicatively coupled to the computer system. In one embodiment, the debugger may support a simple command-line interface to enable a technician to communicate with the debugger through the remote computer.

Proceeding to a block 404C, a watchdog timer for debug commands is initialized. As discussed above in conjunction with FIG. 3, the watchdog timer sets a periodic time that the debugger checks for received debug commands.

In a block 404D, a Hand-Off Block (HOB) is built that stipulates entry points for the debug commands. The HOB is a structure used in the Framework to pass information from one phase to another. In this instance, the PEI phase passes debug information, including debug command entry points, to the DXE phase.

Referring to FIG. 4C, a flowchart 406 shows one embodiment of the logic and operations to migrate the debugger into SMM for an IA32 machine during the DXE phase of the Framework. The DXE phase is facilitated by several components, including the DXE Core, the DXE Dispatcher, and a set of DXE drivers. The DXE Core produces a set of Boot Services, Runtime Services, and DXE Services. The DXE Dispatcher is responsible for discovering and executing DXE drivers in the correct order. The DXE drivers are responsible for initializing the processor, chipset, and platform components as well as providing software abstractions for console and boot devices. These components work together to initialize the platform and to provide the services required to boot an operating system.

SMM is a special mode for handling system wide functions and is intended for use only by system firmware, and not by an OS or an application. When SMM is invoked through a System Management Interrupt (SMI), the processor saves the current state of the processor and switches to a separate operating environment contained in System Management Random Access Memory (SMRAM). While in SMM, the processor executes SMI handler code to perform operations. When the SMI handler has completed its operations, it executes a resume instruction. This instruction causes the processor to reload the saved state of the processor, switch back to protected or real mode, and resume executing the interrupted application or OS tasks.

Starting at a block 406A, the debugger is relocated to System Management Random Access Memory (SMRAM). When the debugger is initially loaded into a memory device of the computer system, the debugger may not necessarily be loaded in SMRAM. During the DXE phase, the debugger may be migrated to a portion of memory designated as SMRAM.

In a block 406B, the IDTR is updated to the new location of the exception handlers in SMRAM. By placing the exception handlers in SMRAM, interrupts are enabled upon entry into SMM and disabled prior to returning to operating system runtime.

Itanium® firmware includes a System Abstraction Layer (SAL), Processor Abstraction Layer (PAL), and an EFI Layer. The SAL is a firmware layer that isolates operating system and other higher-level software from implementation differences in the platform. The PAL provides a firmware abstraction between the processor hardware and system software and platform firmware, so as to maintain a single software interface for multiple implementations of the processor hardware.

PAL-based interrupts are serviced by PAL firmware, system firmware, or the operating system. One type of interrupt is a Platform Management Interrupt (PMI.) A PMI is a platform management request to perform functions such as platform error handling, memory scrubbing, or power management.

PMIs occur during instruction processing causing the flow of control to be passed to the PAL PMI Handler. In the process, system state information is saved in the interrupt registers by the processor hardware and the processor starts to execute instructions from the PAL. The PAL will either handle the PMI if it is a PAL-related PMI or transition to the SAL PMI code if the PMI is a SAL related PMI. Upon completion of the processing, the interrupted processor state is restored and the execution of the interrupted instruction is resumed.

Instead of maintaining an SMRAM area, Itanium® processors use a Firmware Reserved region in memory for storing system software. Firmware Reserved memory includes a portion of memory that holds firmware components similar to those discussed above with reference to the SMRAM used for IA32 processors. The system software stored in the Firmware Reserved area is maintained in OS runtime memory and does not have hardware protection as with SMRAM. In one embodiment, the exceptions handlers in an Itanium® system may not necessarily be migrated as with an IA32 system.

Referring again to FIG. 4A, the logic continues to a block 407 to continue operation of the computer system. Continuing to a decision block 408, the logic determines if the debugger has received a debug command from a remote computer. If the answer is yes, then the logic proceeds to a block 409 to enter the debugger to execute the debug command. In one embodiment, a timer as described above in conjunction with FIG. 3 is used to ensure the debugger does not become hung. After the debug command is executed, the logic proceeds to a block 426 to provide examination of the computer system with the debugger.

If the answer to decision block 408 is no, the logic continues to a decision block 410. In decision block 410, the logic determines if the OS has made an OS runtime firmware call. If the answer is yes, then the logic proceeds to a block 416 where the firmware registers exception handlers with the debugger. In this way, any faults that occur during the firmware call will be directed to the debugger.

Prior to the OS boot, exception handlers are pointing to the debugger. Normally, when the OS begins executing, the OS will map its exception handlers in the IDT/IVA so that the OS has access to its own exception handlers. Upon a firmware OS runtime call, the firmware takes over the exception handlers again and maps its exception handlers in the IDT/IVA, but saves the OS exception handler data. When the firmware returns back to the OS, the OS exception handler data is restored.

In FIG. 4A, after block 416, the logic proceeds to decision block 417 to determine if an exception has occurred during the firmware call. If the answer is yes, then the logic proceeds to block 409 to enter the debugger. If the answer is no, then the logic proceeds to block 418 where on exit of the firmware call, the IDT/IVA is restored to the OS runtime settings. The logic then continues to a decision block 411 described below.

If the answer to decision block 410 is no, then the logic continues to decision block 411 to determine if an operating system runtime SMI (IA32) or Machine Check Abort (MCA) (Itanium®) has occurred. An MCA occurs when the processor has detected a hardware error that needs immediate attention. If the answer to decision block 411 is yes, then the logic continues to a block 420 that depicts the firmware registering exception handlers with the debugger. In this way, exceptions occurring during the SMI or MCA event will be sent to the debugger. The logic continues to a decision block 421 to determine if an exception occurs during the SMI/MCA event. If the answer is yes, then the logic proceeds to block 409. If the answer is no, then the logic continues to a block 422 where upon SMM exit (IA32) or Return From Interrupt (RFI) (Itanium®), the firmware restores the IDT/IVA to the OS runtime settings. The logic then continues to a decision block 412 as described below.

If the answer to decision block 411 is no, then the logic continues to decision block 412 to determine if a wake-event has occurred. If the answer to decision block 412 is yes, then logic continues to block 409 to enter the debugger. If the answer to decision block 412 is no, then the logic proceeds back to block 407 to continue to monitor the system for debug events.

Figure 5:
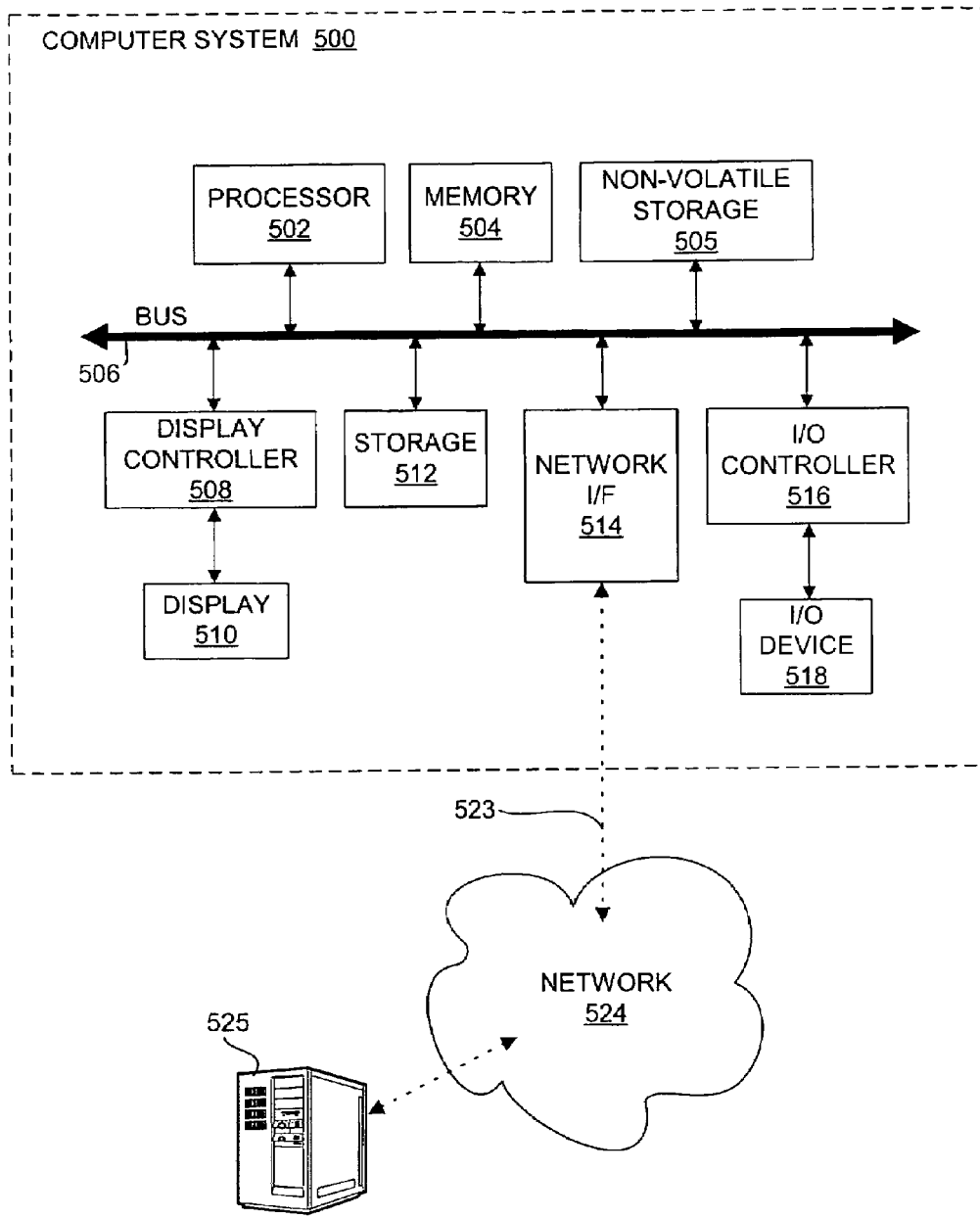
FIG. 5 is a block diagram illustrating one embodiment of an exemplary computer system to implement embodiments of the present invention.

FIG. 5 is an illustration of one embodiment of an example computer system 500 on which embodiments of the present invention may be implemented. Computer system 500 includes a processor 502 coupled to a bus 506. Memory 504, storage 512, non-volatile storage 505, display controller 508, input/output controller 516 and network interface 514 are also coupled to bus 506. The computer system 500 may interface to external systems through the network interface 514. Network interface 514 may include, but is not limited to, a modem, a network interface card (NIC), a T-1 line interface, a T-3 line interface, a token ring interface, a satellite transmission interface, or other interfaces for coupling a computer system to other computer systems. A carrier wave signal 523 is received/transmitted by network interface 514. In the embodiment illustrated in FIG. 5, carrier wave signal 523 is used to interface computer system 500 with a network 524, such as a local area network (LAN), a wide area network (WAN), or the Internet. In one embodiment, network 524 is further coupled to a remote computer 525 such that computer system 500 and the remote computer 525 may communicate over network 524.

Processor 502 may include, but is not limited to, an Intel Corporation x86, Pentium®, Xeon®, or Itanium® family processor, a Motorola family processor, or the like. In one embodiment, computer system 500 may include multiple processors.

Memory 504 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display controller 508 controls in a conventional manner a display 510, which may include a cathode ray tube (CRT), a liquid crystal display (LCD), an active matrix display, or the like. An input/output device 518 coupled to input/output controller 516 may include a keyboard, disk drive, printer, scanner and other input and output devices, including a mouse, trackball, trackpad, joystick, or other pointing device.

The computer system 500 also includes non-volatile storage 505 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), or the like.

Storage 512 includes, but is not limited to, a magnetic hard disk, a magnetic tape, an optical disk, or the like. Some data may be written by a direct memory access process into memory 504 during execution of software in computer system 500. It is appreciated that instructions executable by processor 502 may reside in storage 512, memory 504, non-volatile storage 505 or may be transmitted or received via network interface 514.

For the purposes of the specification, a machine-accessible medium includes any mechanism that provides information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., a read only memory (ROM), a random access memory (RAM), a magnetic disk storage media, an optical storage media, a flash memory device, etc.).

It will be appreciated that computer system 500 is one example of many possible computer systems that have different architectures. For example, computer systems that utilize the Microsoft Windows® operating system in combination with Intel processors often have multiple buses, one of which may be considered a peripheral bus. Workstation computers may also be considered as computer systems that may be used with embodiments of the present invention. Workstation computers may not include a hard disk or other mass storage, and the executable instructions may be loaded from a corded or wireless network connection into memory 504 for execution by processor 502. In addition, handheld or palmtop computers, which are sometimes referred to as personal digital assistants (PDAs), may also be considered as computer systems that may be used with embodiments of the present invention. A typical computer system will usually include at least a processor 502, memory 504, and a bus 506 coupling memory 504 to processor 502.

It will also be appreciated that in one embodiment, computer system 500 may execute operating system software. For example, one embodiment of the present invention utilizes Microsoft Windows® as the operating system for computer system 500. Other operating systems that may also be used with computer system 500 include, but are not limited to, the Apple Macintosh operating system, the Linux operating system, the Microsoft Windows CE® operating system, the Unix operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method, comprising:
   initializing a debugger in a first computer system during the pre-boot phase of the first computer system, the debugger to operate from a firmware environment of the first computer system, the debugger executed by the first computer system independently of an operating system (OS) of the first computer system;
   initializing a communication channel of the first computer system to enable a second computer system to be communicatively coupled to the first computer system;
   communicatively coupling a second computer system to the first computer system at the communication channel;
   entering the debugger in response to a debug event;
   gathering machine state information about the first computer system with the debugger; and
   sending the machine state information to the second computer system from the first computer system.

2. The method of claim 1 wherein the debug event comprises receiving a debug command from the second computer system at the first computer system.

3. The method of claim 2, further comprising setting a watchdog timer at the first computer system to periodically check for the debug command at the communication channel.

4. The method of claim 2 wherein the debug event comprises receiving a wake-event from the second computer system at the first computer system.

5. The method of claim 4 wherein the wake-event comprises a Wake-on Local Area Network (LAN) packet.

6. The method of claim 4 wherein an operating system executing on the first computer system is hung.

7. The method of claim 1 wherein the debug event comprises detecting an exception that invokes an exception handler installed on the first computer system.

8. The method of claim 1, further comprising communicatively coupling a third computer system to the second computer system, the third computer system to interact with the debugger via the second computer system.

9. The method of claim 1 wherein the debugger is configured to operate during the pre-boot phase, the OS runtime phase, and an after-life phase of the first computer system.

10. An article of manufacture including a tangible machine accessible medium having a plurality of instructions stored thereon, the plurality of instructions to be executed independently of an operating system executed on a computer system, the instructions including:
    initializing a debugger in a first computer system during the pre-boot phase of the first computer system, the debugger to operate from a firmware environment of the first computer system;
    entering the debugger in response to a debug event from a second computer system communicatively coupled to the first computer system;
    gathering machine state information about the first computer system with the debugger; and
    sending the machine state information to the second computer system from the first computer system.

11. The article of manufacture of claim 10 wherein the debug event comprises detecting an exception that invokes an exception handler installed on the computer system.

12. The article of manufacture of claim 10 wherein the debug event comprises receiving a wake-event from a second computer system communicatively coupled to the computer system.

13. The article of manufacture of claim 10 wherein the plurality of instructions to operate substantially in compliance with an Extensible Firmware Interface (EFI) specification.

14. A first computer system, comprising:
    a processor;
    a communication channel operatively coupled to the processor, the communication channel to be coupled to a second computer system; and
    at least one flash memory device operatively coupled to the processor, the at least one flash memory device including firmware instructions to be executed independently of an operating system (OS) executed on the first computer system, which when executed by the processor perform operations comprising:
      initializing a debugger in the first computer system during the pre-boot phase of the first computer system, the debugger to operate from a firmware environment of the first computer system;
      initializing the communication channel;
      entering the debugger in response to a debug event;
      gathering machine state information about the first computer system with the debugger; and
      sending the machine state information to the second computer system from the first computer system.

15. The system claim 14 wherein the debug event comprises detecting an exception that invokes an exception handler installed on the first computer system.

16. The system of claim 14 further comprising a second computer system communicatively coupled to the first computer system at the communication channel.

17. The system of claim 16 wherein the debug event comprises receiving a wake-event from the second computer system.

18. The system of claim 16 wherein the debug event comprises receiving a debug command from the second computer system.

19. The system of claim 16 further comprising a third computer system communicatively coupled to the second computer system, the third computer system to interact with the debugger via the second computer system.

20. The system of claim 14 wherein the debugger is configured to operate during the pre-boot phase, an operating system (OS) runtime phase, and an after-life phase of the first computer system.

21. The system of claim 14 wherein the firmware instructions to operate substantially in compliance with an Extensible Firmware Interface (EFI) specification.

22. A method, comprising:
    initializing a debugger in a first computer system during the pre-boot phase of the first computer system, the debugger to operate from a firmware environment of the first computer system, the debugger executed by the first computer system independently of an operating system of the first computer system;
    initializing a communication channel of the first computer system to enable a second computer system to be communicatively coupled to the first computer system;

communicatively coupling a second computer system to the first computer system at the communication channel;

entering the debugger in response to a debug command from the second computer system at the first computer system;

setting a watchdog timer at the first computer system to periodically check for another debug command at the communication channel; and examining the first computer system with the debugger.

23. The method of claim 22 wherein the entering the debugger in response to the debug command includes entering the debugger during the pre-boot phase, an operating system (OS) runtime phase, and an after-life phase of the first computer system.

24. The method of claim 22 wherein an operating system executing on the first computer system is hung.

* * * * *